United States Patent [19]

Hennells

[11] 4,057,129
[45] Nov. 8, 1977

[54] SELF ADJUSTING ENERGY ABSORBER EMPLOYING CONICAL CONTROL SLEEVE

[76] Inventor: Ransom J. Hennells, 45500 N. Territorial Road, Plymouth, Mich. 48170

[21] Appl. No.: 700,616

[22] Filed: June 28, 1976

[51] Int. Cl.² ........................................... F16F 9/48
[52] U.S. Cl. .................................. 188/285; 188/287; 267/65 R
[58] Field of Search ............. 188/285, 287, 286, 315, 188/313, 318, 317, 322, 314, 281, 282; 267/64 R, 64 A, 65 R; 213/43

[56] References Cited

U.S. PATENT DOCUMENTS

| 3,519,311 | 7/1970 | Holden | 188/286 X |
|---|---|---|---|
| 3,605,960 | 9/1971 | Singer | 188/314 X |
| 3,693,767 | 9/1972 | Johnson | 188/287 X |
| 3,706,362 | 12/1972 | Faure | 188/282 |
| 3,750,856 | 8/1973 | Kenworthy | 188/287 |

*Primary Examiner*—Trygve M. Blix
*Assistant Examiner*—Douglas C. Butler
*Attorney, Agent, or Firm*—Blanchard, Flynn, Thiel, Boutell & Tanis

[57] ABSTRACT

A shock absorber including a housing having a ram slidably extending therefrom. A pair of concentric control sleeves divide the housing into inner and outer fluid chambers, and a piston is slidably received within the inner chamber. The inner sleeve has an axially aligned row of openings therein, and also has an elongated groove formed in the outer periphery thereof, which groove is circumferentially spaced from the row of openings. The inner and outer sleeves have opposed conical surfaces forming a narrow clearance space therebetween. A spring coacts between the housing and the outer sleeve for urging same axially in a direction whereby the openings in the inner sleeve are effectively closed, as by maintaining the narrow space at a minimum dimension. When a shock load is imposed on the ram causing the piston to move inwardly within the inner chamber, the fluid therein is pressurized and flows through the openings into the narrow space. The pressure of the fluid reacts against the conical surface on the outer sleeve and causes it to be axially displaced in opposition to the urging of the spring, thereby increasing the dimension of the narrow space whereby the fluid flows therethrough into the adjacent groove, from which it is discharged into the outer chamber.

8 Claims, 4 Drawing Figures

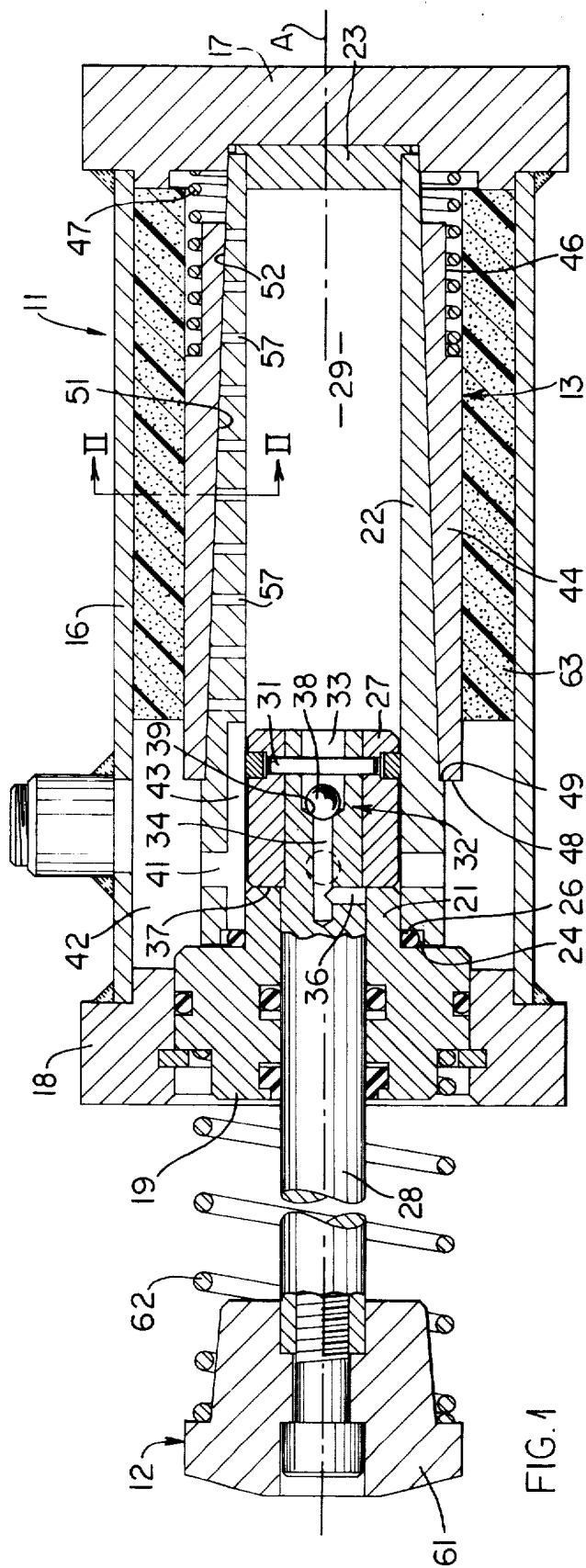
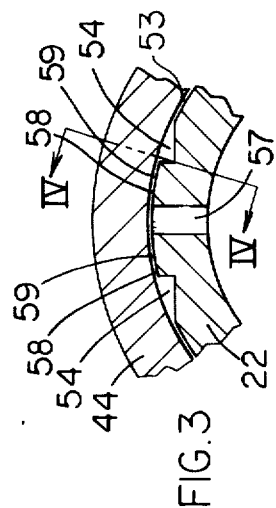
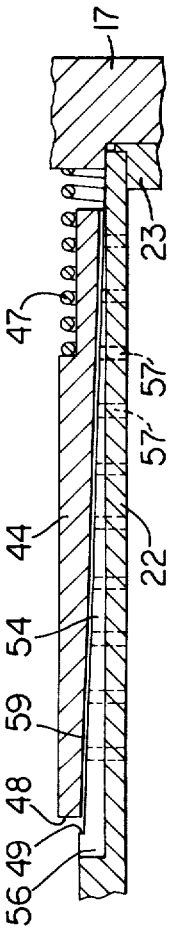

SELF ADJUSTING ENERGY ABSORBER EMPLOYING CONICAL CONTROL SLEEVE

CROSS REFERENCE TO RELATED APPLICATIONS

This application is related to copending application Ser. No. 686,585, filed May 14, 1976, which in turn is a continuation-in-part of application Ser. No. 608,885, filed Aug. 29, 1975.

FIELD OF THE INVENTION

This invention relates generally to energy absorbers and, in particular, to an adjustable hydraulic shock absorber which automatically self adjusts in response to the magnitude of the load imposed thereon.

BACKGROUND OF THE INVENTION

My copending application Ser. No. 608,885, filed Aug. 29, 1975, and my subsequent copending application Ser. No. 686,585 filed May 14, 1976, disclose an improved energy absorber, particularly an adjustable hydraulic shock absorber, which has proven highly desirable with respect to both its energy absorbing capability and its adjustability. This shock absorber has also proven desirable since the internal flow control structure permits the absorption of energy as imposed on the external ram without resulting in excessive heating of the fluid, which phenomena is commonly encountered in other known shock absorbers employing alignable flow control openings. Further, the shock absorber disclosed in my copending applications has exhibited superior wear characteristics in that the flow control sleeves have experienced substantially less erosion-type wear, particularly around the flow openings, than was commonly experienced in prior shock absorbers.

The shock absorber disclosed in the above-mentioned applications have also exhibited highly desirable durability and strength, while at the same time greatly facilitating the manufacture and assembly of the shock absorber by permitting easier selection of parts, and minimizing the problems of alignment during assembly of the shock absorber.

While the shock absorber disclosed in the above-mentioned application possesses highly desirable and superior structural and operational characteristics, particularly in contrast to prior shock absorbers employing alignable flow control openings, nevertheless there still exists the need for a durable and efficient shock absorber which will automatically self-adjust during operation so as to compensate for variations in the applied load.

One prior attempt at providing such an automatically self-adjusting shock absorber is disclosed in U.S. Pat. No. 3,750,856, issued to Kenworthy. The shock absorber of this patent, however, utilizes concentric inner and outer control sleeves having a plurality of openings formed therein, which openings are alignable to control the flow between inner and outer chambers. The use of such alignable openings is undesirable since, as noted above, structures of this type experience substantial wear due to erosion around the openings. The fluid also experiences undesirable heating. In addition, the automatic adjustment in this shock absorber is achieved by utilizing the increased pressure within the piston-receiving chamber to activate one of the sleeves for displacing same axially, thereby decreasing the overlap between the aligned openings so that the fluid flow between the chambers is further restricted. This mode of operation thus results in increased throttling of the fluid between the chambers, which thereby increases the erosion around the openings and also the heating of the fluid. Further, if the shock absorber is not properly initially adjusted with respect to the stop which coacts with and limits the axial displacement of the movable control sleeve, then the sudden application of a large shock load can cause a "lock up" of the shock absorber due to the pressure fluid causing a complete closing off of the openings. Thus, this shock absorber possesses numerous undesirable features and does not provide for automatic self-adjustment of the shock absorber in a manner which results in optimum flow control.

Another variation of a known automatically adjustable shock absorber is disclosed in U.S. Pat. No. 3,605,960, issued to Singer. The shock absorber of this patent, however, possesses the same basic structure as Kenworthy, described above, and thus possesses the same disadvantages.

Accordingly, it is an object of the present invention to provide an improved shock absorber which automatically self-adjusts when a load is imposed thereon so as to result in optimum absorption of energy, which shock absorber overcomes the above-mentioned shortcomings.

A further object of this invention is to provide an improved self-adjusting shock absorber, as aforesaid, which possesses a flow control structure wherein the dimension of a flow passage automatically increases in response to pressure increases within the shock absorber, thereby permitting at least momentary increased flow to minimize the fluid pressure, whereby the optimum energy absorption characteristic of the shock absorber is accordingly automatically adjusted in response to the characteristics (such as force, velocity and acceleration) of the applied load.

Other objects and purposes of this invention will be apparent to persons familiar with shock absorbers upon reading the following specification and inspecting the accompanying drawings.

To summarize the present invention, the shock absorber includes a housing having a ram slidably extending therefrom. A pair of concentric control sleeves divide the housing into innner and outer fluid chambers. A piston associated with the ram is slidably received within the inner chamber. The inner control sleeve has an axially aligned row of openings therein, and also has an elongated groove formed in the outer periphery thereof, which groove is circumferentially spaced a preselected distance from the row of openings. The outer sleeve is preferably free of openings. The inner and outer sleeves have compatible outer and inner conical surfaces, respectively, adapted to form a narrow clearance space therebetween. A spring coacts between the housing and the outer sleeve for urging same axially in a direction whereby the openings in the inner sleeve are effectively closed, as by maintaining the narrow space between the conical surfaces to a minimum dimension. When a shock load is imposed on the ram causing the piston to move inwardly within the inner chamber, the fluid within the inner chamber is pressurized and flows outwardly through the openings into the narrow space. The pressure of the fluid as it reacts against the conical surface on the outer sleeve causes the outer sleeve to be axially displaced in opposition to the urging of the spring, thereby increasing the dimension of the narrow space whereby the fluid flows therethrough into the adjacent groove, from which it is discharged into the outer chamber. The spring thus causes the outer sleeve to automatically axially adjust responsive to the pressure of the fluid so as to provide the optimum dimension of the narrow space between the sleeves, thereby resulting in optimum absorption of the energy from the externally applied load.

BRIEF DESCRIPTION OF THE DRAWINGS

FIG. 1 is a central sectional view of an automatically adjustable energy absorber according to the present invention.

FIG. 2 is an enlarged, fragmentary sectional view taken along line II—II in FIG. 1 and showing the control passage between the sleeves in a substantially closed position.

FIG. 3 is a view similar to FIG. 2 but showing the intermediate control passage in an open condition.

FIG. 4 is a fragmentary sectional view taken along line IV—IV in FIG. 3.

Certain terminology will be used in the following description for convenience in reference only and will not be limiting. For example, the words "upwardly", "downwardly", "rightwardly" and "leftwardly" will designate directions in the drawings to which reference is made. The words "inwardly" and "outwardly" will refer to contraction and extension, respectively, of the reciprocating ram, which contraction and extension occurs when the ram respectively moves rightwardly and leftwardly as appearing in FIG. 1. The words "inwardly" and "outwardly" will also refer to directions toward and away from, respectively, the geometric center of the energy absorber and designated parts thereof. Said terminology will include the words mentioned above, derivatives thereof and words of similar import.

DETAILED DESCRIPTION

FIG. 1 illustrates an automatically adjustable energy absorber 10, specifically a hydraulic shock absorber, which includes a housing 11 having a ram assembly 12 slidably positioned in and extending therefrom. A flow control sleeve assembly 13 is positioned within the housing for controlling relative movement between the ram assembly and the housing due to imposition of an external load on the shock absorber. The flow control sleeve assembly 13 automatically self-adjusts, as explained hereinafter, to permit optimum absorption of the energy from the externally applied load.

The housing 11 includes a hollow cylindrical sleeve 16 fixedly connected between a pair of platelike end members 17 and 18. The end member 18 in turn has a bearing sleeve 19 fixedly and sealingly mounted therein, which sleeve has an annular projection 21 on the inner end thereof.

The flow control sleeve assembly 13 is disposed between the end members of the housing and includes an inner cylindrical control sleeve 22 extending substantially the full axial length of the housing. Sleeve 22 is fixed with respect to the housing and has the rightward end thereof pressed onto an annular end cap 23, which end cap 23 is seated within a recess formed in the end member 17 and abuts thereagainst. The leftward end of sleeve 22 is snugly seated on the annular projection 21. An annular recess 24 is preferably formed in the leftward end of sleeve 22, and a conventional elastomeric O-ring 26 is disposed within this recess and clampingly engaged between the opposed walls formed on the bearing sleeve 19 and the control sleeve 22 to create a sealed relationship therebetween. This structure overcomes any problems caused during the assembly of the shock absorber due to the accumulation of axial tolerances on the individual parts.

The ram assembly 12 has substantially cylindrical piston means on the inner end thereof, which piston means is formed by a piston 27 fixedly secured to the inner end of a piston rod 28. The piston 27 is slidably guided for axial movement within the control sleeve 22 and, in cooperation with the inner periphery of the sleeve 22, defines one of the boundaries of a fluid chamber 29.

Piston 27 is fixedly secured to piston rod 28 by a pin 31 extending radially therebetween, which pin also cooperates with a one-way check valve assembly 32 associated with the inner end of the ram assembly. This check valve assembly includes a first passage formed as a large diameter bore 33 extending coaxially inwardly from the inner free end of the piston rod. This bore 33 in turn communicates with and is coaxially aligned with a further passage formed as a small diameter bore 34. A further passage 36 extends radially of the piston rod adjacent the rear face of the piston and communicates with the bore 34 adjacent the axially inner end thereof. The outer end passage 36 communicates with a chamber 37 which is formed within the sleeve 22 and is located between the opposed axial faces of the piston 27 and the annular projection 21 when the piston is moved slightly inwardly (rightwardly in FIG. 1) away from the bearing sleeve 19.

To control flow through the passage arrangement defined by the passages 33, 34 and 36, there is provided a movable valve member in the form of a ball 38 which is adapted to seat against an annular conical valve seat 39 formed at the junction between the bores 33 and 34. The ball 38 is of larger diameter than the bore 34, and is loosely confined in the bore 33 by the pin 31.

The inner control sleeve 22 has small holes or openings 41 formed through the wall thereof and communicating at the radially outer ends with an outer annular chamber 42 formed between the sleeve assembly 13 and the outer housing sleeve 16. The holes 41 are disposed adjacent the leftward end of the sleeve 22, which end has the piston 27 associated therewith when the shock absorber is in its extended position. Holes 41 are positioned directly adjacent the inner axial face of the annular projection 21 so that the holes 41 thus communicate with the chamber 37 at all times. At least one of the holes 41 also has the radially inner end thereof joined in flow communication with an axially extending groove 43 formed in the inner wall of the sleeve 22, which groove 43 terminates at a location which is disposed slightly forwardly of the front face of the piston 27 when the ram assembly is in its fully extended position.

Flow control sleeve assembly 13 also includes an outer cylindrical control sleeve 44 disposed concentric with and in surrounding relationship to the inner control sleeve 22. The sleeve 44 has the rightward end thereof spaced from the end member 17, whereby the outer sleeve 44 can thus be moved axially through a limited extent relative to the inner sleeve 22. In the illustrated embodiment, an annular recess 46 is provided around the outer sleeve 44 adjacent its rightward end, and resilient means in the form of a conventional coil-type compression spring 47 is positioned within this recess.

The opposite ends of the coil spring 47 are seated on the end member 17 and on a shoulder formed on the outer control sleeve 44. The spring 47 normally urges the outer control sleeve 44 leftwardly so that the leftward end face 48 thereof abuts against a shoulder 49 formed on the inner control sleeve 22.

The outer control sleeve 44 is preferably freely rotatably supported with respect to the inner control sleeve 22 so as to simplify both the manufacture and assembly of the shock absorber. Sleeve 44 can, however, be axially keyed with respect to the inner sleeve 22 if desired.

The control sleeves 22 and 44 have opposed conical surfaces formed thereon for permitting adjustment in the energy absorption characteristic of the shock absorber. For this purpose, the outer control sleeve 44 has an inner conical surface 51 which is disposed opposite and is adapted to be substantially engaged with an outer conical surface 52 as formed on the inner control sleeve 22. The conical surfaces 51 and 52 are of an identical taper, which taper preferably extends at a small angle relative to the longitudinally extending axis A of the shock absorber. In the illustrated embodiment, the taper of the conical surfaces is normally in the range of between 1° and 5°, and preferably 2°, although the present invention also contemplates the use of a larger angle of taper. The conical surfaces 51 and 52 are normally maintained in a position of substantial engagement with one another due to the resilient urging of the spring 47, whereupon the clearance between the conical surfaces 51 and 52 is thus maintained at a minimum. Thus, the shock absorber is maintained in what is commonly referred to as a closed position, in which position the outer sleeve 51 is disposed in its leftward most position resulting in the condition illustrated in FIGS. 1 and 2.

To provide for controlled flow of fluid from the inner chamber 29 through the sleeve assembly 13 to the outer chamber 42, the inner and outer control sleeves are relatively axially movable so as to vary the spacing between the conical surfaces 51 and 52, thereby resulting in the formation of a small annular clearance space 53 therebetween which is of a selectively variable radial dimension. The inner sleeve 22 has a pair of elongated slots 54 formed in the outer conical surface 52 thereof, which slots 54 extend axially of the sleeve 22 throughout substantially the complete length of the outer sleeve 44. Slots 54 terminate, at the leftward ends thereof, in openings 56 (FIG. 4) which communicate with the outer chamber 42. The slots 54 are disposed closely adjacent and on opposite sides of an axially extending row of openings 57 which are formed in the inner sleeve 22 and communicate with the inner chamber 29. The slots 54 and their relationship to the row of openings 57 results in the formation of narrow circumferentially extending lands 58 between the row of openings and the adjacent slots. The lands 58 are adapted to be spaced from the opposed inner conical surface 51 and thus defines narrow flow control passages 59 therebetween, which passages 59 are of selectively adjustable radial width for controlling the fluid flow from the openings 57 into the slots 54.

The slots 54 extend substantially parallel to the axis A and are preferably provided with a cross-sectional area which progressively increases as the slot extends from the inner or rightward end thereof to the outer or leftward end thereof, as illustrated in FIG. 4. While FIGS. 2 and 3 illustrate the use of slots 54 positioned closely adjacent but on opposite sides of the row of openings 57, it will be appreciated that the shock absorber can be provided with only a single slot 54 if desired.

Since the openings 57 and slots 54 are all formed in the inner sleeve 22, the outer sleeve 44 is thus free of slots or openings so that this sleeve is thus of uniform wall thickness through the full circumferential extent thereof. This minimizes the stresses on the outer sleeve 44 and permits the use of a minimum wall thickness. At the same time, this enables the sleeve 44 to freely rotate relative to the inner sleeve 44 without effecting the flow control characteristics between the inner and outer chambers.

The piston rod 28 projects outwardly from the housing of the shock absorber and has an enlarged head 61 on the free end thereof, thereby facilitating the application of an external load to the shock absorber. A conventional coil-type compression spring 62 coacts between the head 61 and the adjacent end of the housing for automatically returning the ram assembly to its fully extended position after the external load has been removed therefrom. In addition, the outer fluid chamber 42 preferably has a compressible sponge-like member 63 positioned therein so as to compensate for volume changes caused by the inward movement of the piston rod. This member 63, which is preferably of a rubber or plastic closed cell structure, substantially encircles the sleeve 44 throughout the axial extent thereof.

OPERATION

In an operational position, the energy absorber 10 is normally with its ram assembly 12 in an extended position substantially as illustrated in FIG. 1. In this operational position, the spring 47 maintains the outer control sleeve 44 urged leftwardly so as to abut against the shoulder 49 on the inner control sleeve 22. This results in the control sleeve assembly 13 being maintained in its closed or minimum clearance position, in which position the opposed conical surfaces 51 and 52 are positioned closely adjacent but normally slightly spaced from one another so that a small annular clearance space exists between the control sleeves. This prevents the conical sleeves from wedging together and also permits limited fluid flow between the sleeves.

When a shock load is imposed on the energy absorber, and ignoring the automatic adjustment of the shock absorber, then this causes the piston 27 to move inwardly into the inner chamber 29. This pressurizes the fluid in the inner chamber and forces same outwardly through the openings 57 and across the narrow flow control passages 59 into the elongated slots 54, from which the fluid flows along the slots into the outer chamber 42. When flowing from the inner to the outer chamber, the minimum restriction encountered by the fluid occurs through the narrow flow control passages 59, which passages are of minimum area and thus throttle the fluid to thereby control the energy absorption characteristic of the shock absorber.

According to the present invention, the magnitude of the clearance defined by the narrow flow control passage 59 automatically adjusts in response to the pressure of the fluid within the shock absorber, thereby compensating for the magnitude of the applied load and resulting in optimum absorption of the energy. When the external load is imposed on the ram assembly, the piston causes pressurization of the fluid within the inner chamber 29. Some of this fluid flows through openings 57 into the narrow flow control passages 59. Since these passages have their outer surfaces defined by the inner conical surface 51, the pressure fluid within the passages 59 acts in a direction which is perpendicular to the conical surface 51, so that the pressure fluid exerts a small axial component of force which is directed rightwardly in FIG. 1. This axial component of the pressure force accordingly causes the outer control sleeve 44 to move axially rightwardly in FIG. 1 in opposition to the urging of the spring 47. The control sleeve 44 is thus axially moved through an extent which is substantially proportional to the magnitude of the fluid pressure, or increase in the fluid pressure, so that the areas of the flow control passages 59 are likewise increased in proportion to the pressure of the fluid within the inner chamber. The area of the flow control passages 59 is thus automatically increased or decreased substantially in proportion to the pressure of the fluid within the inner chamber 29, whereby the flow of fluid through the sleeve assembly 13 and the energy absorbed by the fluid automatically varies in relationship to the magnitude of the external shock load imposed on the ram assembly.

Thus, the automatic axial adjustment of the outer sleeve 44 so as to vary the area of the flow passages 59, coupled with the sequential closing off of the openings 57 as the piston moves axially toward the rightward end of the housing, results in a progressive deceleration of the piston as it approaches the inner end of the chamber 29 (rightward end in FIG. 1). the external shock load imposed on the shock absorber is thus substantially dissipated, so that the ram is thus uniformly decelerated and hence stopped.

As the piston initially moves into the chamber 29, the fluid within chamber 29 is pressurized and flows outwardly through the openings 57 into the passages 59 whereby the pressure fluid acts against the outer sleeve 44 over a substantial axial extent thereof. This large pressure force thus causes the sleeve 44 to move axially (rightwardly in FIG. 1) in opposition to the urging of the spring 57, thereby increasing the cross-sectional area of the passages 59 so that the pressure of the fluid is thus minimized. However, as the piston moves further into the chamber 29 (which movement occurs rightwardly in FIG. 1) the openings 57 are progressively cut off by the piston so that the pressure fluid flows outwardly into the passages 59 through a smaller number of openings 57. Less pressure fluid thus acts against the outer sleeve 44, whereby the pressure force imposed on the sleeve tending to move it axially rightwardly is hence reduced, thereby making it easier for the spring 47 to return the outer sleeve 44 axially leftwardly so as to reduce the cross-sectional area of the passages 59. At the same time, when the piston has reached a position wherein it has moved forwardly a substantial distance into the chamber 29, the external shock load imposed on the ram possesses substantially less energy, so that the return of the outer sleeve by the spring thus permits the effective dissipation of the remaining externally applied energy so as to permit the desired deceleration and subsequent stopping of the external load. This axial displacement of the control sleeve 44 responsive to pressure increases, which movement tends to minimize the fluid pressure increases within the chamber 29, thus cooperates in a favorable manner with the progressive closing off of the openings 57 and the restoring force imposed on the sleeve 44 by the spring 47 so as to provide the desired uniform deceleration of the external load.

During the inward movement of the piston into the chamber 29, some of the fluid displaced from chamber 29 through the flow control assembly 13 into the outer chamber 42 will also flow through the holes 41 so as to fill the chamber 37 which is formed behind the piston. After the shock load is removed from the ram assembly, the spring 62 will automatically return the ram assembly to its fully extended position, during which movement the fluid within chamber 37 flows through the one-way check valve assembly 32 into the fluid chamber 29. When the piston approaches its fully extended position, then the outer fluid chamber 42 also communicates with the inner chamber 29 through the hole 41 and groove 43. This facilitates the return of fluid into the inner chamber 29, and permits a full retraction of the piston.

Due to the small taper provided on the conical surfaces of the control sleeves, the axial component of pressure force imposed on the outer control sleeve 44 is extremely small, even though the magnitude of the fluid pressure is high. This thus permits the utilization of a rather weak spring 47 for controlling the automatic adjustment of the outer sleeve 44. By suitably selecting the initial compression and spring rate of the spring 47, the shock absorber of the present invention can be designed to permit adjustment in the position of the control sleeve 44 only when the pressure within the shock absorber exceeds a preselected level, which level is of course proportional to a preselected externally applied shock load.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a fluid-type energy absorber having a substantially closed housing, ram means slidably disposed on said housing for receiving a shock load thereon, said ram means including a piston slidably disposed within said housing and fixedly connected to a piston rod extending outwardly from one end of said housing, a sleeve member disposed within said housing and cooperating with said piston for forming first and second fluid chambers which are in selective fluid communication with one another, said piston being slidably supported for displacement relative to said sleeve member in the axially extending direction thereof, and flow passage means providing selective fluid communication between said first and second chambers for limiting the fluid flow between said chambers for absorbing the energy of an externally applied load as said piston is moved axially relative to said sleeve member, said flow passage means including opening means extending radially through the wall of said sleeve member and being elongated in the axially extending direction of said sleeve member, the improvement comprising control means for automatically adjusting said flow passage means responsive to the magnitude of the externally applied load to at least momentarily increase the minimum flow area of said flow passage means substantially in proportion to the pressure increase of the fluid within one of the chambers as said pressure increases in response to imposition of an external load, said control means including a control sleeve which is relatively movable with respect to said sleeve member for increasing the minimum flow area of said flow passage means, said control sleeve being concentric with said sleeve member and extending axially thereof over at least that portion of said sleeve member containing said opening means therein, said piston being slidably engaged with one of the annular peripheral surfaces of said sleeve member, and said control sleeve being closely positioned adjacent the other annular peripheral surface of said sleeve member.

2. An energy absorber according to claim 1, wherein said sleeve member is axially restrained with respect to said housing, said control sleeve being axially displaceable relative to said sleeve member, and resilient means coacting with said control sleeve for urging same in an axial direction to thereby maintain said control sleeve in a position wherein a minimum flow area is created in said flow passage means.

3. An energy absorber according to claim 2, wherein said sleeve member and control sleeve cooperate to define a narrow axially extending passageway therebetween which communicates with the other chamber, said narrow passageway comprising the minimum flow area of said flow passage means and being defined at least in part by a tapered surface formed on said control sleeve and extending axially thereof so that the pressure fluid which flows through said opening means into said narrow passageway reacts against said tapered surface and imposes an axial force on said control sleeve which displaces same axially in opposition to the urging of said resilient means.

4. An energy absorber according to claim 3, wherein said sleeve member and control sleeve have opposed conical surfaces thereon which are of a diverging taper extending in the same direction as the urging imposed on said control sleeve by said resilient means, said opposed conical surfaces defining said narrow passageway therebetween, and said control sleeve being free of any openings extending radially through the wall thereof.

5. In a fluid-type energy absorber having a housing, ram means slidably disposed on the housing for receiving a shock load thereon, the ram means including a piston slidably disposed within the housing and connected to a piston rod which extends outwardly from the housing, the piston being normally maintained adjacent one end of the housing, a first sleeve member disposed within the housing and coacting with the piston for forming first and second fluid chambers which are in limited fluid communication with one another, the piston being slidably supported within the first sleeve member and the first fluid chamber being defined within the first sleeve member and extending between the piston and the other end of said housing, and flow passage means for providing limited fluid flow from said first chamber into said second chamber responsive to axial displacement of said piston into said first chamber, said flow passage means including opening means extending radially through the wall of said first sleeve member and extending axially thereof over a substantial portion of the length of said first chamber, the improvement comprising control means coacting with said first sleeve member and said flow passage means for automatically adjusting the minimum flow area of said flow passage means in response to variations in the pressure of the fluid within said first chamber for regulating the energy absorption capacity of said energy absorber by controlling the flow from said first chamber to said second chamber, said control means including a second sleeve member disposed concentric with and closely surrounding said first sleeve member, said first and second sleeve members having opposed conical surfaces thereon which are disposed closely adjacent and directly opposite so as to define a narrow flow passageway therebetween, said narrow flow passageway being in communication with said opening means and comprising a part of said flow passage means, said conical surfaces diverging in one axial direction of said sleeve members, resilient means coacting with said second sleeve member for resiliently urging same in said one axial direction whereby pressurization of the fluid in said first chamber in response to displacement of said piston causes pressurized fluid to flow through said opening means into said passageway so that said pressurized fluid reacts against the conical surface on said second sleeve member and axially displaces same in the other axial direction to thereby increase the flow area defined by said passageway.

6. An energy absorber according to claim 5, wherein said second sleeve member is free of openings extending radially through the wall thereof.

7. An energy absorber according to claim 6, wherein said flow passage means includes an elongated groove formed in the conical surface of said first sleeve member and extending axially of said first sleeve member for communication at one end thereof with said second fluid chamber, said groove being adjacent but circumferentially displaced from said opening means and communicating therewith by said narrow passageway.

8. An energy absorber according to claim 7, wherein said second sleeve member is freely rotatably supported on said first sleeve member, and said second sleeve member being of uniform radial wall thickness throughout the complete circumferential extent thereof as measured within a plane extending perpendicular to the axis of said second sleeve member.

* * * * *